G. H. ROWE AND C. W. HUMPHREY.
METHOD AND APPARATUS FOR METERING FLUID.
APPLICATION FILED JULY 14, 1921.

1,436,778.

Patented Nov. 28, 1922.

Inventors:
George H. Rowe
Clifford W. Humphrey
by Arthur P. Knight
Attorney.

Patented Nov. 28, 1922.

1,436,778

UNITED STATES PATENT OFFICE.

GEORGE H. ROWE AND CLIFFORD W. HUMPHREY, OF LOS ANGELES, CALIFORNIA.

METHOD AND APPARATUS FOR METERING FLUID.

Application filed July 14, 1921. Serial No. 484,764.

*To all whom it may concern:*

Be it known that we, GEORGE H. ROWE and CLIFFORD W. HUMPHREY, citizens of the United States, residing at Los Angeles, in the county of Los Angeles and State of California, have invented a new and useful Method and Apparatus for Metering Fluid, of which the following is a specification.

This invention relates to a metering apparatus for registering the amount of fluid delivered from a reservoir, or other source, or through pipes, or other conduits, and is adapted to be applied to the metering of water, oil, or other liquid, or of air, fuel gas, or other gas. The main object of the invention is to provide a metering apparatus which is accurate in operation and simple and cheap in construction.

A further object of the invention is to enable a comparatively small and cheap gas meter to be used for measurement of a relatively large volume of liquid.

Another object of the invention is to enable the registering apparatus to be placed at a considerable distance from the conduit conveying the fluid to be metered.

Another object of the invention is to avoid obstruction to the flow of fluid through such conduit by operation of the meter.

The accompanying drawings illustrate embodiments of our invention, and referring thereto:

Figure 1:
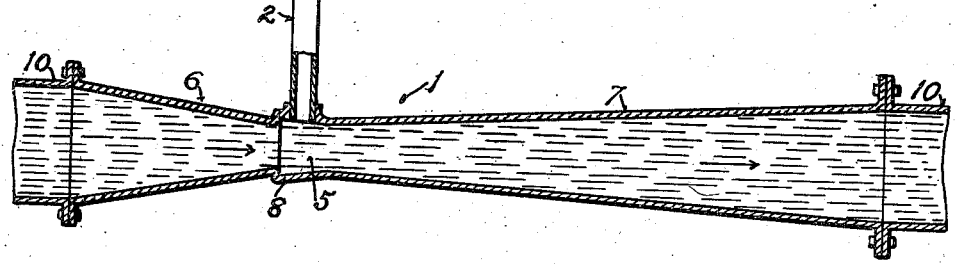
Fig. 1 is a vertical longitudinal section of our improvised metering device, the registering device being shown in elevation.
Figure 2:
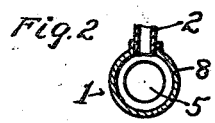
Fig. 2 is a transverse section through the passage means for conducting the fluid to be measured the section being taken at the point of connection to the metering device.

Referring to Figs. 1 and 2, our invention comprises a tubular member 1, or other means defining a passage adapted to receive the flow of fluid to be metered, an aspirating tube or passage 2 opening into tubular member 1, and a registering gas meter 3 connected to said aspirating tube or passage and having an air inlet 4, the construction being such that by means of the flow of fluid in tubular member 1 air is drawn through the air inlet 4, registering gas meter 3 and aspirating tube or passage 2 into the passage means 1.

Figure 3:
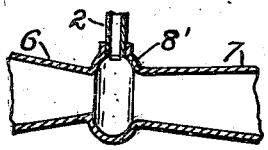
Fig. 3 is a sectional view of a modified form of aspirating means for these in connection with the invention.

We have found it desirable to form the passage means 1 as a Venturi tube, having a throat 5, tapering inlet 6 and expanding outlet 7, and have further found that it is desirable to provide an annular enlargement 8 at said throat, the aspirating tube 2 opening into such annular enlargement. This enlargement may be formed as a forwardly converging cone, as shown in Fig. 1, or, as shown at 8' in Fig. 3, it may be formed as a swell or rounded annular enlargement on the passage means 1.

The registering gas meter may be of any suitable or usual construction adapted for registering the flow of gas (in this case air) therethrough, it being understood that the registering meter may be comparatively small, as it registers only the amount of air drawn through the aspirating tube 2, which is relatively small as compared with the total volume or quantity of fluid passing through tubular member or passage means 1. It is preferred to so construct and adjust this registering meter that the dial marks thereon represent the quantity of fluid passing through the tubular member 1, so that the instrument is direct reading and requires no calculations by the user.

The operation is as follows:

The tubular member or passage means 1 is connected in the pipe line 10 conducting the fluid to be metered, so that such fluid is forced to pass through said tubular member 1. The fluid in passing through the throat 5 of said tubular member produces an aspirating effect at the enlargement 8 and causes aspiration or suction of air from inlet 4 through registering gas meter 3 and aspirating tube 2. The amount of air so aspirated, we have found to be substantially proportional to the amount of flow passing through the tubular member 1, so that the registration in the gas meter 3 will, with appropriate marking of the dials and adjustment of the parts, give a direct reading for the amount of fluid delivered through the pipe or conduit 10. The throat of the Venturi tube being in substantially free communication, through the gas meter, with the outer air, the flow of fluid through the throat is due simply to the actual working head of the fluid. The registering meter 3 may, if desired, be mounted adjacent to or at any desired distance from the tubular member 1 for example, if desired, the meter 3 may be remote from the tubular member 1, being, for example, above ground, while the conduit 10 and the tubular member 1 connected thereto are below ground.

It will be understood that in the operation of the device in the metering of water, or other liquid, the air aspirated in the manner above disclosed, into the pipe line, is carried forward therein and may, if necessary, be allowed to escape from the liquid in any suitable manner, for example, in the case of irrigation water, it will escape as the water passes to the open irrigating ditches.

The application of the invention to the metering of liquids is of especial advantage in that it enables a small and cheap gas meter to be substituted for a comparatively large and expensive liquid meter. The described metering device also has the advantage of presenting a substantially free and unobstructed passage through the passage means 1, for the fluid to be metered, so that dirt, stones, or other solids contained in the liquid may pass freely through the conduit without interference with the operation of the meter.

What we claim is:

1. The method of metering the flow of liquid in a conduit, which consists in effecting the passage of air into the body of liquid by the aspirating effect of its flow, and metering the amount of air so aspirated.

2. A fluid metering apparatus comprising a passage means adapted to conduct the fluid to be metered, and a registering gas meter having an inlet connected with the outer air and an outlet communicating with said passage means and subjected to the aspirating effect of the flow therein, said meter being adapted to register the amount of air aspirated through said gas meter into said passage means.

3. A metering apparatus for fluid, comprising a passage means adapted to conduct the fluid to be metered, a registering gas meter having an inlet for air, and an aspirating tube connected to said meter and communicating with said passage means, so that air will be aspirated through said gas meter into said passage means by the flow of liquid in said passage means and the gas meter will be operated so as to measure the amount of fluid passing through said passage means.

In testimony whereof we have hereunto subscribed our names this 7th day of July, 1921.

GEORGE H. ROWE.
CLIFFORD W. HUMPHREY.